United States Patent
Woywood

[11] B 3,995,107
[45] Nov. 30, 1976

[54] CHARGE COUPLED PARALLEL-TO-SERIAL CONVERTER FOR SCENE SCANNING AND DISPLAY

[75] Inventor: Dennis Joseph Woywood, Cherry Hill, N.J.

[73] Assignee: RCA Corporation, New York, N.Y.

[22] Filed: May 8, 1974

[21] Appl. No.: 468,100

[44] Published under the second Trial Voluntary Protest Program on March 9, 1976 as document No. B 468,100.

[52] U.S. Cl. .................................................. 178/7.1
[51] Int. Cl.² ........................................... H04N 3/14
[58] Field of Search ..................... 178/7.1, 7.3 D; 307/221 C, 221 R, 304, 221 D

[56] References Cited
UNITED STATES PATENTS

| | | | |
|---|---|---|---|
| 3,609,392 | 9/1971 | Tetik .................... | 307/221 C |
| 3,696,250 | 10/1972 | Weimer ................ | 178/7.1 X |
| 3,800,080 | 3/1974 | Fuwa .................... | 178/7.1 |
| 3,801,884 | 4/1974 | Sequin ................. | 307/221 D X |
| 3,851,154 | 11/1974 | Beecham .............. | 307/221 R X |

Primary Examiner—Richard Murray
Assistant Examiner—Mitchell Saffian
Attorney, Agent, or Firm—Carl V. Olson; Edward J. Norton

[57] ABSTRACT

A parallel-to-serial converter is described for use in translating a plurality of parallel line scan signals, derived from scanning a scene, to a serial signal suitable for application to a conventional television-type raster-scan display device. The parallel analog signals from a linear array of photodetectors scanned across a scene are simultaneously clocked into an equal number of charge coupled device (CCD) registers. The stored signals are later read out serially line-after-line and applied to a television type display. Two arrays of CCD registers are provided so that one can be loaded while the other is being read out. Each CCD register for a given line of video information consists of two parallel registers which alternate in receiving (and supplying) signals representing successive elemental areas along the line of the scene.

4 Claims, 3 Drawing Figures

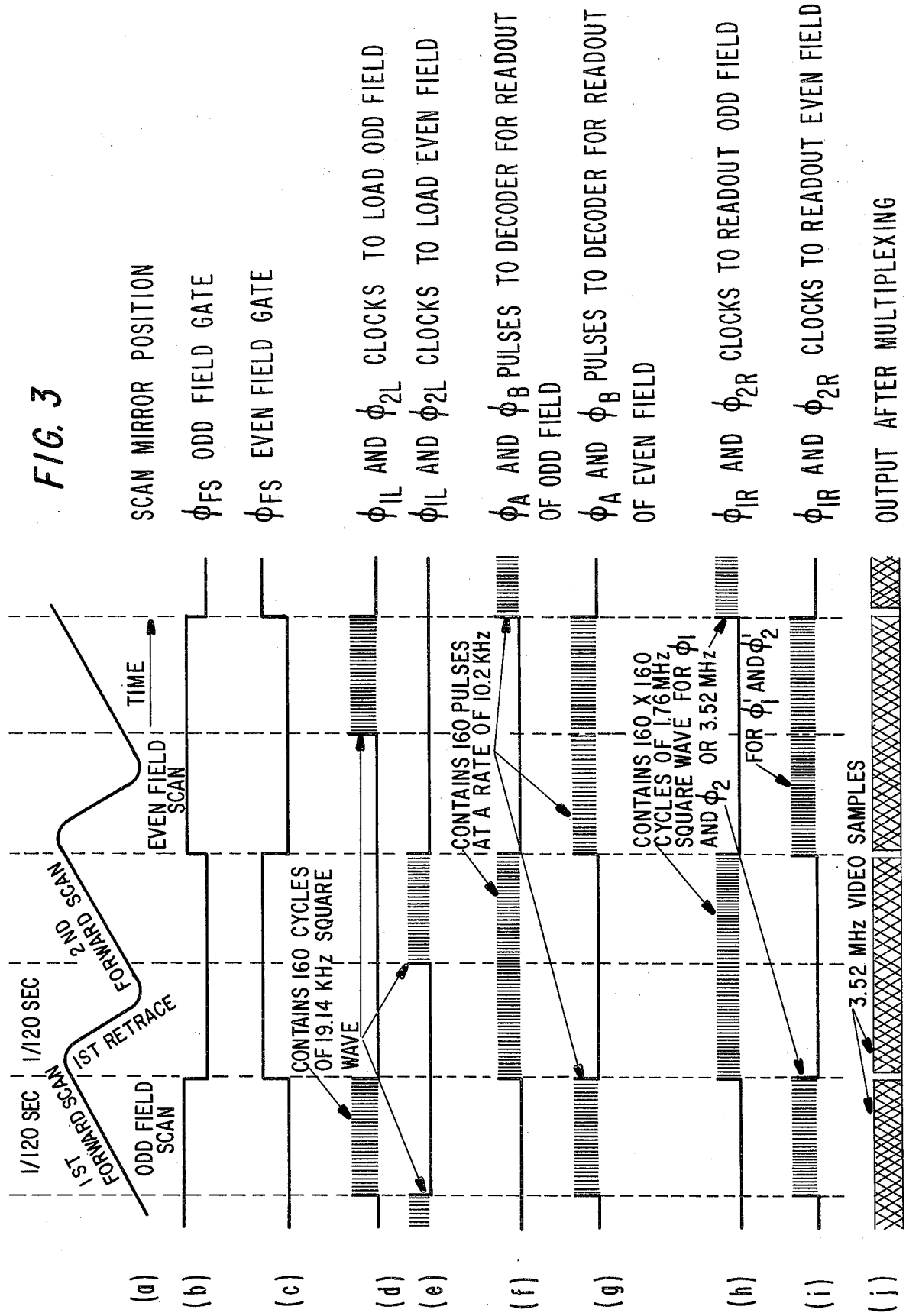

CHARGE COUPLED PARALLEL-TO-SERIAL CONVERTER FOR SCENE SCANNING AND DISPLAY

The invention described herein was made in the course of or under a contract or a subcontract thereunder with the Department of the Air Force.

BACKGROUND OF THE INVENTION

The invention relates generally to systems for optically scanning a scene and generating electrical signals suitable for operating a television-type display. The invention relates particularly to systems where the optical scanning of one field of the scene is done in parallel, simultaneously using one photosensor for every line of the scene, rather than using one photosensor in zig-zag, scan-retrace raster-scanning fashion. Parallel scanning is useful in thermal imaging systems where the response time of a thermal sensor is inadequate for raster scanning. The parallel image line signals need to be stored, and then read out serially for application to a raster-scan television-type display. Since the elemental line scan video signals are analog signals each having any one of many values, the storage of the multi-level signals in the past has been difficult to implement. It is therefore desirable to provide an improved parallel-to-serial converter system in which advantage is taken of the analog signal handling capabilities of charge coupled devices. Such capabilities are described in U.S. Pat. No. 3,758,794 issued on Sept. 11, 1973, to W. F. Kosonocky for a "Charge Coupled Shift Register" and assigned to the assignee of this present application. Additional information is provided by the article "The New Concept for Memory and Imaging: Charge Coupling" by Lawrence Altman appearing in the June 21, 1971, issue of *Electronics Magazine*, pp. 50–59.

SUMMARY OF THE INVENTION

A plurality of parallel analog signals derived by simultaneously scanning an equal plurality of lines of a scene are fed into an equal plurality of charge coupled device (CCD) registers. The register for each scanned line consists of a pair of registers, and elemental portions of the signal, corresponding with elements of the scene scanned, are applied alternately to one, and then the other, of the registers of the pair. The line signals thus stored in the CCD registers are subsequently clocked out in line-after-line serial sequence and applied to a television-type display device. The arrangement permits the clocking transfer rate in the CCD registers to be one-half of what would otherwise be required.

BRIEF DESCRIPTION OF THE DRAWING

FIG. 3 is a chart of signal waveforms present at various locations in the system of FIG. 1 and the circuits of FIG. 2.

DESCRIPTION OF THE PREFERRED EMBODIMENT

Figure 1:
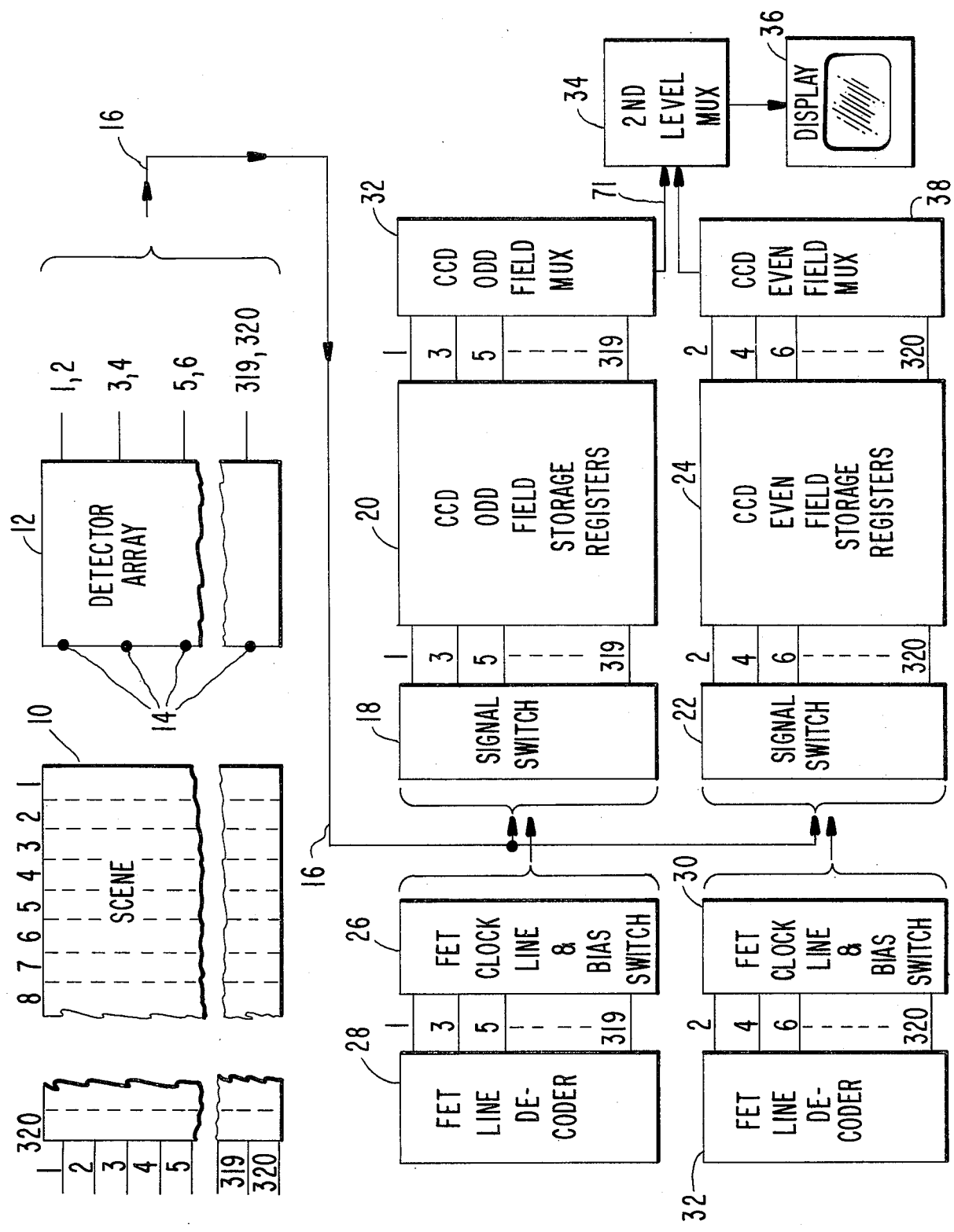
FIG. 1 is a block diagram of a scene scanning and display system constructed according to the teachings of the invention.

Reference is now made in greater detail to FIG. 1 of the drawing for a description of one actual example of the overall system for scanning a scene and creating a display of the scene on a display device. The scene is represented at 10 and is shown as being divided into 320 horizontal scan lines each of which is divided in the horizontal direction into 320 elemental areas. The scene is scanned by a detector array 12 including 160 photosensors 14 arranged in a vertical line for simultaneously scanning one-half of the 320 horizontal lines of the scene 10 at a time. The photosensors 14 may be sensitive to long wavelength signals for use in a thermal imaging system.

Each photosensors 14 produces an electrical signal which, after amplification, is made available at a respective one of the output leads labelled 1,2; 3,4; 5,6; . . . ; 319,320. The 160 photosensors 14 are moved relative to the scene 10 so that the sensors in one pass across the scene generate signals corresponding with the 160 odd lines of the scene. Output signals are then simultaneously provided on bus 16 for all the odd lines 1, 3, 5, . . . 319. The next time that the detector array scans the scene, the detector array is shifted slightly in the vertical direction so that the sensor 14 scan the 160 even lines of the scene. This causes signals to be simultaneously provided on output bus 16 for all the even lines 2, 4, 6, . . . 320 of the scene 10. The described scanning sequence as shown in FIG. 3a provides for a desired "vertical interlace" in which one complete frame of a scene is constituted by an odd field including the odd lines of the scene, and subsequently an even field including the even lines of the scene.

The 160 line signals produced during the odd field scanning pass over the scene by the detector array 12 are simultaneously clocked through a signal switch 18 by a field gate wave shown in FIG. 3b to 160 corresponding charge coupled device (CCD) odd field storage registers 20. During the next scan, which is a scan of the even field, the line signals on bus 16 are clocked through a signal switch 22 by a field gate wave shown in FIG. 3c to 160 corresponding CCD even field storage registers 24. The signal switch 18 is operated under the control of a FET clock and bias switch 26 and a FET line decoder 28; and even field signals switch 22 is similarly under the control of clock line and decoder units 30 and 32.

During the odd field scan of the scene by the detector array 12, the odd line signals are clocked into, and stored in, the CCD odd field storage registers 20 (waveform FIG. 3d). Then, during the subsequent even field scan, the even line signals from the detector array are clocked into the CCD even field storage registers 24 (waveform FIG. 3e). While the even field registers are being loaded, the odd field information previously stored in the odd field registers 20 is read out (FIG. 3h) through an odd field multiplexer 32 and a second level multiplexer 34 to a television-type display device 36. Likewise, when the odd field registers 20 are being loaded, the even field registers 24 are read out (FIG. 3i) through the multiplexer 38 and the second level multiplexer 34 to the display device 36. The display device 36 reproduces a picture frame created by the vertical interlace of an odd field from registers 20 and an even field from registers 24 (FIG. 3j).

The multiplexers 32 and 38 are constructed using charge coupled device (CCD) technology. The odd field multiplexer 32 functions to direct, from the storage registers 20 to the second level multiplexer 34, first the line 1 information, then the line 3 information, followed by the line 5 information, and so on until the line 319 signal information is outputed. The even field multiplexer 38 operates in a similar manner to direct the even line signals, in a serial line-by-line manner, to the second level multiplexer 34. The second level multiplexer 34 merely directs alternately the serial odd field information and the even field information to the display 36 for vertically interlacing the odd and even fields in the recreation of a frame of the scene 10.

Figure 2:
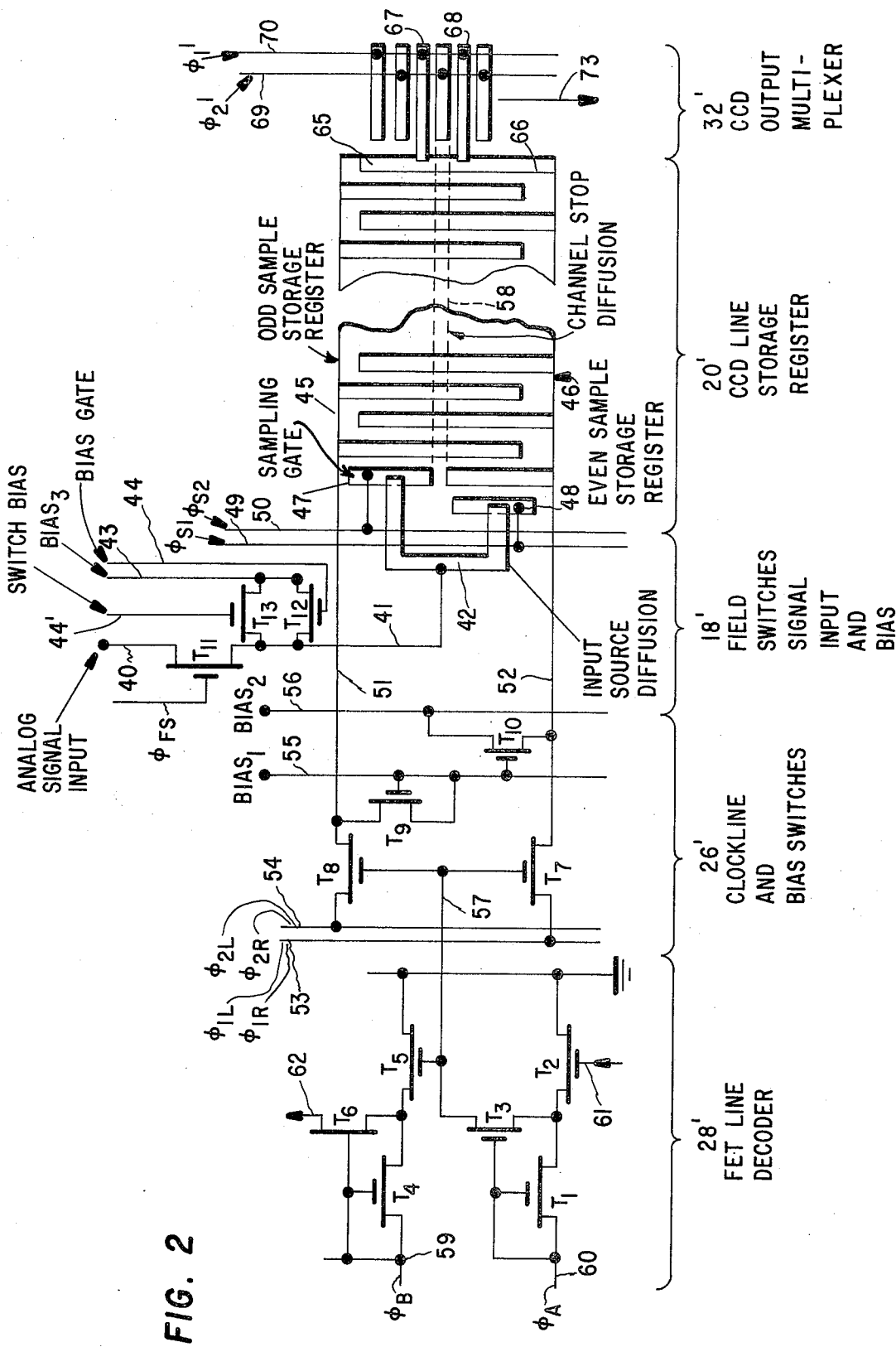
FIG. 2 is a circuit diagram showing the circuits employed in the system of FIG. 1 for handling the signal resulting from the scanning of one of the many horizontal lines in a scene.

Reference is now made to FIGS. 2 and 3 for a description in greater detail of the field effect transistor (FET) circuits, and the charge coupled device (CCD) circuits provided in boxes 28, 26, 18, 20 and 32 for any single one of the odd line of the scene, and provided in boxes 32, 30, 22, 24, and 38 for any single one of the odd lines of the scene.

The array 20 of CCD odd field storage registers shown in FIG. 1 includes 160 CCD registers, each one being as shown at 20' in FIG. 2. An analog signal from a corresponding one of the photosensors 14 in FIG. 1 is applied over lead 40 in cable 16 and through an FET field switch gate $T_{11}$ and a lead 41 to an input signal source diffusion 42. The control signal $\phi_{FS}$ as shown in FIG. 3b causes gate $T_{11}$ to be conductive during the loading of the register 20', and to be nonconductive during reading out from the register 20'.

The field effect transistor (FET) $T_{12}$ is used to apply a "fat zero" dc bias on line 43, under control of a bias gate signal on line 44, to the input source diffusion 42 to enhance the signal transfer efficiency. Efficiency is enhanced because trapping states that would otherwise interact with the signal charge are effectively tied up with the fat zero charge. The purpose of transistor $T_{13}$ is to allow the imposition of the fat zero level on line 43 with a time constant much shorter than can be achieved with transistor $T_{12}$. This is accomplished during intervals when signal is not present on line 43, and is used in a system where the input is ac coupled, and dc restoration is used on the incoming signal. The pertubation due to dc restoration appears as signal and must be compensated for with short time constants, such as are allowed by transistor $T_{13}$.

The CCD line storage register 20' actually consists of a pair of parallel registers, one called an odd sample storage register 45, and the other called an even sample storage register 46. The two registers of the pair are separated by a channel stop diffusion 58. The input analog signal on line 41 and on the input source diffusion 42 is applied through odd sampling gate 47 to the odd sample register 45, and through even sampling gate 48 to the even sample register 46. This is accomplished under the control of a signal switch 18' including sampling control signals $\phi_{S1}$ and $\phi_{S2}$ applied over leads 49 and 50 to the gates 47 and 48. The effect of the gating is to couple successive elemental area scanner signal samples from the corresponding line scan detector 14 alternately to a stage in the odd sample register 45, and then to a stage in the even sample register 46. By this construction the clocking or stepping of elemental signal samples through the individual CCD registers of the pair is at a clock rate half of what it would otherwise be. Stated another way, a higher frequency of operation is possible.

The pair of charge storage device (CCD) registers 45 and 46 receive signal samples and transfer them to the right from CCD stage to CCD stage until the registers are filled with analog signals corresponding with the elements of one line of the scene 10 in FIG. 1. This accepting and shifting of elemental signals requires the application over lines 51 and 52 of clock signals $\phi_1$ and $\phi_2$ from clock lines 53 and 54 connected to clock sources (not shown). The clocking signals are supplied from clock buses 53 and 54 through field effect transistor switches $T_7$ and $T_8$ in the clockline and bias switch circuit 26'. Bias lines 55 and 56, and FETs $T_9$ and $T_{10}$ are provided to insure that the proper bias potentials are maintained on the CCD register pair 45,46 when the registers are isolated from the clock buses 53,54 by the switch FETs $T_7$ and $T_8$. The clock lines 53 and 54 receive clock pulse waves $\phi_{1L}$ and $\phi_{2L}$ (FIG. 3d) having a frequency of 19.1 kHz during loading of an input signal into register pair 45,46, and the clock lines receive clock pulse waves $\phi_{1R}$ and $\phi_{2R}$ (FIG. 3h) having a frequency of 1,760 kHz during the readout of stored signals to the output multiplexer 32'.

The FET switches $T_7$ and $T_8$ in the clockline and bias switch circuit 26' are enabled over line 57 from a FET line decoder circuit 28'. The line decoder circuit 28' is one stage of a dynamic FET ratio-type shift register including two inverter transistors $T_1$, $T_2$ and $T_4$, $T_5$, and two transmission gates $T_3$, $T_6$. Line decoder clock signals $\phi_B$ and $\phi_A$ (FIG. 3f) are supplied to leads 59 and 60. During the loading of signals into the CCD register pair 45,46, the line decoder output on line 57 must be maintained at a negative potential. This can be accomplished by maintaining the clock signals input lines 59 and 60 at a negative potential. At the end of the signal loading period, the signal at input line 59 is returned to ground potential.

During the reading out of stored information from the CCD register pair 45,46, decoder clock signals $\phi_B$ and $\phi_A$ (FIG. 3f) having a frequency of 10.2 kHz are supplied to leads 59 and 60. A single pulse is applied to the gate 61 of FET $T_2$ from a timing source (not shown) if the decoder 28' shown in one which handles the first line of a field, or the pulse is applied from the preceding stage if the decoder 28' is one which handles some subsequent line of the field. The pulse applied to gate 61 causes an output on line 57 that enables the switch 26' for a period of 1/120 seconds necessary to scan one complete horizontal line of the scene. A pulse output is then provided on lead 62 from the drain of FET $T_6$ to the next line decoder circuit for handling the signals corresponding with the next horizontal line of the scene. The 160 line decoder circuits 28' of a line decoder unit 28, for signals corresponding to a whole field of a scene, are coupled together by successively connecting leads 61 and 62 to act as a dynamic shift register clocked by clock signals $\phi_B$ and $\phi_A$. But, this shift register operation occurs only during read-out in a line-by-line manner from the CCD storage register pair 45,46. The circuits for the many lines are then operated sequentially. In contrast, during read-in of signals from the scanning detector array 12, signals are applied simultaneously in parallel to all CCD register line pairs 45,46, of a field, and the circuits for all lines are simultaneously operative.

During read-out of the line information in the CCD register pair 45,46, the charges therein are clocked to the right to the last electrodes 65 and 66, of the register pair 45 and 46, which are separated by the channel stop diffusion 58. The charges on electrodes 65 and 66 are transferred to electrodes 67 and 68 of a charge coupled device output multiplexer circuit 32' by charge coupling action. The multiplexer circuit 32' is two stages of a charge coupled device shift register supplied with clock pulses $\phi_2'$ and $\phi_1'$ on lines 69 and 70 to cause charges to be propagated downwardly in the direction 73 to the second level multiplexer 34 shown in FIG. 1. The output multiplexer circuit 32' is clocked at twice the rate of the CCD storage register pair 45,46, and in such a way that, an elementary signal sample charge from register 45 is followed by a sample charge from register 46, and then from register 45, and so on. The alternating odd and even signal samples corresponding with one horizontal scan line are propagated as charges toward the output 71 of the odd field multiplexer 32 in FIG. 1.

After all the signal samples corresponding to one horizontal line have reached the output line 71, the signals corresponding to the next odd field horizontal line are serially read out to the output line 71, and so on until all lines of the odd field have been supplied serially to the second level multiplexer 34, and on to the television-type display device. Thereafter, the signals corresponding to all of the horizontal lines in the even field are serially read out through through the second level multiplexer 34 to the display device 36. The second level multiplexer 36 merely alternately passes the outputs of the odd field multiplexer 32 and the even field multiplexer 38 to provide the usual vertical interlace of the fields (FIG. 3j) on the screen of the display device 36.

The odd field multiplexer 32 is a CCD register in which signals from the 160 line registers are propagated to the output 71, and the signals from line 1 experience a greater delay than signals from a line closer to the output 71. This difference in transit time is compensated for by making the CCD line storage register pairs 45,46, which are closer to the output 71 with an appropriately greater number of stages than are needed to store the line of information. In this way the outputs of the various line circuits are made to appear to be equally close to the output 71.

What is claimed is:
1. In combination,
first and second storage arrays each including a plurality of charge coupled device (CCD) shift registers,
switch means operating to apply a corresponding plurality of line scan signals in parallel to said plurality of registers in said first storage array to fill the first array, and then to apply a corresponding plurality of subsequent line scan signals in parallel to said plurality of registers in said second storage array to fill the second array, and
multiplexer means operating while said first storage array is being filled to couple signals serially from register-after-register in the second storage array to a signal output line, and operative while the second storage array is being filled to couple signals serially from register-after-register in the first storage array to the signal output line.

2. The combination as defined in claim 1, wherein each CCD shift register in said first and second storage arrays includes a pair of parallel CCD storage registers, and wherein said switch means is constructed to apply elemental signal samples from each input signal alternately to one CCD storage register, and then the other register, of a corresponding pair of registers, and said multiplexer means is constructed to couple elemental signal samples from alternately one CCD storage register, and then the other register, of a pair of registers corresponding with a given input signal, whereby signal samples are shifted from stage to stage in each CCD register of a pair at half the rate that would be required using a single CCD register having as many stages as the pair of registers.

3. The combination as defined in claim 2, wherein said plurality of signals are provided by a scanner source of $m$ line channels of parallel information derived by horizontally scanning $n$ successive elemental sampled areas on each of $m$ lines of a scene.

4. In combination,
a scanner source of $m$ line channels of parallel information derived by horizontally scanning $n$ successive elemental sampled areas on each of $m$ lines of a scene,
first and second odd and even field storage arrays each including $m \times n$ charge coupled device (CCD) stages for storing charges corresponding with all the elemental areas of a scene, the CCD stages for each of the $m$ scan lines being arranged into a pair of parallel CCD storage registers each having $n/2$ stages per register,
switch means operating to apply signals from the scanner during alternate scans to said odd field storage array to fill the odd array, and then to apply signals during intermediate scans to said even field storage array to fill the even array, said switch means being constructed to apply elemental area scanner signal samples from each one-line channel alternately to a stage in one CCD storage register, and then to a stage in the other register, of a corresponding pair of registers, and
multiplexer means operating while one field storage array is being filled to apply signals from the other field storage array to a video signal output line, said multiplexer means being constructed to apply to said line elemental area scanner signal samples from alternately one CCD storage register, and then the other register, of a pair of registers corresponding with a first horizontal line of a scene, and then similarly to successively apply to said line signal samples from successive pairs of registers corresponding with successive horizontal lines of the scene,
whereby signal samples are shifted from stage to stage in each CCD register of a pair at half the rate that would be required using a single CCD register having as many stages as the pair of registers.

* * * * *